US009325560B2

(12) United States Patent
Du (10) Patent No.: US 9,325,560 B2
(45) Date of Patent: Apr. 26, 2016

(54) METHOD, DEVICE AND SYSTEM FOR PROVIDING WEB PAGE CONTENT ACCORDING TO USER RANKING

(71) Applicant: Huawei Technologies Co., Ltd., Shenzhen, Guangdong (CN)

(72) Inventor: Lin Du, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 608 days.

(21) Appl. No.: 13/727,480

(22) Filed: Dec. 26, 2012

(65) Prior Publication Data

US 2013/0117451 A1 May 9, 2013

Related U.S. Application Data

(63) Continuation of application No. PCT/CN2012/073794, filed on Apr. 11, 2012.

(30) Foreign Application Priority Data

Jun. 27, 2011 (CN) .......................... 2011 1 0175018

(51) Int. Cl.
*G06F 15/173* (2006.01)
*H04L 29/08* (2006.01)
*H04L 29/06* (2006.01)

(52) U.S. Cl.
CPC ................ *H04L 29/08* (2013.01); *H04L 63/00* (2013.01); *H04L 63/08* (2013.01); *H04L 63/10* (2013.01); *H04L 63/102* (2013.01); *H04L 67/22* (2013.01)

(58) Field of Classification Search
CPC .......... H04L 63/00; H04L 63/08; H04L 63/10
USPC .......................... 709/217–219, 225–226, 245
See application file for complete search history.

(56) References Cited

U.S. PATENT DOCUMENTS

| 7,647,387 | B2 * | 1/2010 | Bellare et al. ................. 209/217 |
| 8,478,904 | B2 * | 7/2013 | Jungck .............. H04L 29/12028 709/218 |
| 8,504,488 | B2 * | 8/2013 | Dutta ..................... G06Q 30/02 706/12 |
| 8,738,791 | B1 * | 5/2014 | Martini ................. H04L 63/102 709/225 |
| 2005/0188096 | A1 * | 8/2005 | Kim et al. ...................... 709/231 |
| 2010/0306249 | A1 * | 12/2010 | Hill et al. ....................... 707/769 |
| 2013/0318015 | A1 * | 11/2013 | Dutta ..................... G06Q 30/02 706/12 |

FOREIGN PATENT DOCUMENTS

| CN | 1453954 A | 11/2003 |
| CN | 101132404 A | 2/2008 |
| CN | 101771726 A | 7/2010 |

OTHER PUBLICATIONS

International search report and written opinion issued in corresponding to PCT application No. PCT/CN2012/073794, dated Jul. 19, 2012, total 12 pages.

* cited by examiner

*Primary Examiner* — Bharat N Barot
(74) *Attorney, Agent, or Firm* — Huawei Technologies Co., Ltd.

(57) ABSTRACT

The present invention provides a method, device and system for controlling web page access. The method includes: receiving an access request message of a user, and obtaining an Internet access account of the user according to the access request message; obtaining a corresponding user rank identifier according to the Internet access account, including the user rank identifier in the access request message, and sending the access request message w the user rank identifier to a content provider server, so that the content provider server returns corresponding web page information to the user according to the user rank identifier.

14 Claims, 5 Drawing Sheets

METHOD, DEVICE AND SYSTEM FOR PROVIDING WEB PAGE CONTENT ACCORDING TO USER RANKING

This application is a continuation of International Application No. PCT/CN2012/073794, filed on Apr. 11, 2012, which claims priority to Chinese Patent Application No. 201110175018.1, filed on Jun. 27, 2011, both of which are hereby incorporated by reference in their entireties.

FIELD OF THE INVENTION

The present invention relates to the field of communication technologies, and in particular, to a method, a device and a system for controlling web page access.

BACKGROUND OF THE INVENTION

A green Internet access service, as implied by the name, provides clean and moral, secure, and civilized network environment and content for users who subscribe to this service. In this service, through content filtering or a content control technology, a user is forbidden or restricted from accessing illegal Internet content such as pornographic, violent, and reactionary content. The essence of green Internet access is to classify web pages and control access to different types of web pages by a user. Currently, there are mainly two solutions. One is to perform access control through a client or a browser, and the other is to control user's network access through a network device. Both solutions adopt a technology similar to a blacklist or a whitelist, which are as follows:

A basic principle of a blacklist technology is: A device provider provides a blacklist in advance. The blacklist includes not only an illegal uniform/universal resource locator (Uniform/Universal Resource Locator, URL) but also an illegal keyword. If a URL or a keyword included in an access request message of the user is in the blacklist, the access is forbidden. A specific processing procedure is that after obtaining the access request message of the user, extracting the URL and the keyword in the access request message of the user, querying the blacklist according to the extracted URL and keyword, and determining, according to a query result, whether the user may perform the access. Classification accuracy of a URL blacklist or a keyword blacklist obtained in the blacklist through a classification technology and performance of querying the blacklist are key points of this solution, and both have technical difficulties currently. The URL blacklist in a URL blacklist is generally provided by a device provider or a security vendor. A maintenance vendor of the URL blacklist is not a professional content provider, and lacks high accuracy of classifying legal URLs and illegal URLs. Therefore, a risk of a check error or a check omission exists. In addition, because matching of the URL and the keyword needs to be performed in real time, analysis and matching performed according to the blacklist need to consume many processing resources of an access control device. If a large number of users request to access a network in a short period of time, performing the access control reduces user's access speed and affects user's Internet access experience.

In view of a defect that a check error may occur in the blacklist technology, the prior art provides a whitelist technology. A basic principle of the whitelist technology is: An access control device provider pre-specifies a range of network resources that may be accessed by users, namely, a whitelist; if a URL that a user requests to access is included in the whitelist, the user is allowed to perform the access; if a URL that a user requests to access is not included in the whitelist, the access is forbidden. Similar to the blacklist technology, in the whitelist technology, matching also needs to be performed on the whitelist, which also consumes plenty of processing resources of the access control device.

During a process of implementing the present invention, the inventor finds that the prior art has at least the following problems:

Due to limitations of a processing capability and a storage capability of the access control device, access control technologies including the blacklist technology and the whitelist technology generally implement only web site-level control (in the blacklist technology, if a certain part of a URL extracted from an access request message of a user is consistent with a URL of an illegal web site in the URL blacklist, the access is forbidden; in the whitelist technology, if a certain part of a URL extracted from an access request message of a user is consistent with a URL of a legal web site in the URL whitelist, the access is allowed). For a case that a web site includes web pages of multiple control levels, for example, both legal web pages and illegal web pages, it is impractical to store URLs of multiple web pages on a same web site in a blacklist or a whitelist, and therefore, web page-level access control cannot be implemented. Therefore, in the prior art, there are some problems in granularity of access control, and it is difficult to implement fine-granularity access control.

SUMMARY OF THE INVENTION

To overcome a defect that fine-granularity access control is difficult to implement in the prior art, embodiments of the present invention provide a method, a device, and a system for controlling web page access.

An embodiment of the present invention provides a method performed by a deep packet inspection device on a network for controlling web page access, where the method includes:
  receiving an access request message of a user, obtaining an Internet access account of the user according to the access request message, and obtaining a corresponding user rank identifier according to the Internet access account; and
  including the user rank identifier in the access request message, and sending the access request message with the user rank identifier to a content provider server to request the content provider server to return corresponding web page information to the user according to the user rank identifier.

An embodiment of the present invention provides a method for controlling web page access, where the method includes:
  receiving an access request message, and obtaining a user rank identifier from the access request message;
  filtering, according to the user rank identifier, content in a web page corresponding to a uniform resource locator URL included in the access request message; and
  returning filtered web page information to a user.

An embodiment of the present invention provides a deep packet inspection device, including:
  a first receiving module, configured to receive an access request message of a user, and obtain an Internet access account of the user according to the access request message;
  a first obtaining module, configured to obtain a corresponding user rank identifier according to the Internet access account; and
  a first sending module, configured to include the user rank identifier obtained by the first obtaining module in the access request message, and send the access request message with the user rank identifier to a content provider server to request the content provider server to return corresponding web page information to the user according to the user rank identifier.

An embodiment of the present invention provides a content provider server, including:

a second receiving module, configured to receive an access request message with a user rank identifier;

a second obtaining module, configured to obtain the user rank identifier from the access request message received by the second receiving module;

a processing module, configured to filter, according to the user rank identifier obtained by the second obtaining module, content in a web page corresponding to a URL included in the access request message; and a second sending module, configured to return web page information filtered by the processing module to a user.

An embodiment of the present invention provides a system for controlling web page access, where the system includes the foregoing deep packet inspection device and content provider server.

By using the method, device and system for controlling web page access provided in the embodiments of the present invention, a user rank identifier is embedded in an access request message of a user and sent to a content provider server, so that the content provider server returns corresponding web page information to the user according to different user rank identifiers. Therefore, it is implemented that the content provider server performs content ranking and filtering according to the user rank identifier, and web page-level access control is implemented, thereby improving granularity of content control.

BRIEF DESCRIPTION OF THE DRAWINGS

To illustrate the technical solutions in the embodiments of the present invention or in the prior art more clearly, accompanying drawings required for describing the embodiments or the prior art are briefly introduced in the following. Apparently, the accompanying drawings in the following description are merely some embodiments of the present invention, and persons of ordinary skill in the art may further obtain other drawings according to these accompanying drawings without creative efforts.

DETAILED DESCRIPTION OF THE EMBODIMENTS

To make the objectives, technical solutions, and advantages of the embodiments of the present invention more comprehensible, the following clearly and completely describes the technical solutions in the embodiments of the present invention with reference to the accompanying drawings in the embodiments of the present invention. Apparently, the embodiments to be described are merely part rather than all of the embodiments of the present invention. All other embodiments obtained by persons of ordinary skill in the art based on the embodiments of the present invention without creative efforts shall fall within the protection scope of the present invention.

To overcome defects that web page-level access control cannot be implemented and control granularity is not fine in the prior art, the embodiments of the present invention provides a solution: A user rank identifier is embedded in an access request message of a user and sent to a content provider server, so that the content provider server returns corresponding web page information to the user according to different user rank identifiers. Therefore, it is implemented that the content provider server performs content ranking and filtering according to the user rank identifier, and web page-level access control is implemented, thereby improving granularity of content control.

Figure 1:
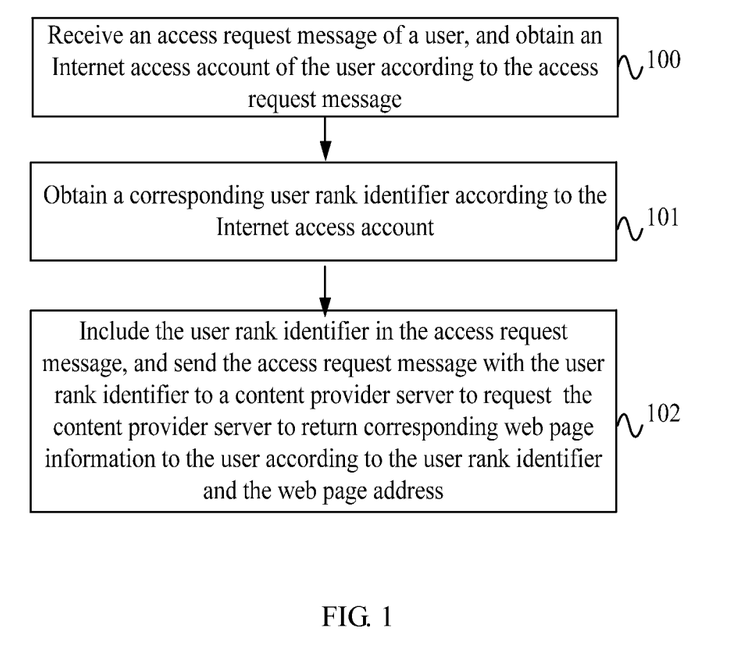
FIG. 1 is a flowchart of a method for controlling web page access according to an embodiment of the present invention.

FIG. 1 is a flowchart of a method for controlling web page access according to an embodiment of the present invention. As shown in FIG. 1, the method includes:

Step 100: Receive an access request message of a user, and obtain an Internet access account of the user according to the access request message.

After authentication of the Internet access account of the user succeeds, the user sends an access request message with a URL to a deep packet inspection device, to request to access a network. According to the access request message, the deep packet inspection device obtains the Internet access account used by the user to access the network.

Giving more details, manners for the deep packet inspection device to obtain, according to the access request message, the Internet access account used by the user to access the network include, but are not limited to the following two types:

Manner 1: Obtain a corresponding Internet access account of the user based on an IP address. The deep packet inspection device obtains the IP address included in the access request message, and finds the Internet access account corresponding to the IP address included in the access request message by searching according to a correspondence list that contains data regarding a correspondence between IP addresses and Internet access accounts.

Optionally, the correspondence list regarding a correspondence between IP addresses and Internet access accounts is obtained in the following way: Before receiving the access request message, and in a process of performing authentication of the Internet access account on the user and an authentication authorization accounting (Authentication, Authorization, Accounting, AAA) server, the deep packet inspection device obtains a remote authentication dial in user service (Remote Authentication Dial In User Service, Radius) packet sent by the AAA server, obtains an IP address and an Internet access account from the Radius packet, and stores the correspondence list that contains data regarding a correspondence between IP addresses and Internet access accounts in the deep packet inspection device and accordingly in advance; or, after receiving the access request message of the user, the deep packet inspection device sends a request to an AAA server to obtain the correspondence list regarding a correspondence between IP addresses and Internet access accounts.

Manner 2: Obtain a corresponding Internet access account of the user based on identity authentication information. For the purpose of security, the user inserts an Internet access security certificate that includes the identity authentication information of the user into a USB interface of a host when accessing the network; when the access request message is sent, the identity authentication information is included in the access request message. The deep packet inspection device may obtain the identity authentication information of the accessing user from the access request message, and finds the corresponding Internet access account of the user by searching from a correspondence list which contains data regarding a correspondence between identity authentication information and Internet access accounts and is stored in the deep packet inspection device or obtained from an authentication server.

Step 101: Obtain a corresponding user rank identifier according to the Internet access account of the user.

The deep packet inspection device further obtains the corresponding user rank identifier according to the Internet access account of the user and a correspondence list that contains data regarding a correspondence between Internet access accounts and user rank identifiers.

The foregoing correspondence list regarding a correspondence between Internet access accounts and user rank identifiers may be stored in the deep packet inspection device, and may also be stored in another device, such as a user ranking device. The obtaining the corresponding user rank identifier according to the correspondence between Internet access accounts and user rank identifiers is as follows:

When the correspondence list regarding a correspondence between Internet access accounts and user rank identifiers is pre-stored in the deep packet inspection device, the deep packet inspection device searches the locally stored correspondence list that contains data regarding a correspondence between Internet access accounts and user rank identifiers and finds the user rank identifier corresponding to the obtained Internet access account. By using this manner, the user rank identifier may be obtained quickly and a utilization ratio of a network device may be improved; or When the correspondence list regarding a correspondence between Internet access accounts and user rank identifiers is not stored in the deep packet inspection device, but stored in another device (such as the user ranking device), the deep packet inspection device receives the access request message sent by the user, obtains the Internet access account of the user from the access request message, and sends a query request message with the obtained Internet access account to the user ranking device. According to the locally stored correspondence list that contains data regarding a correspondence between Internet access accounts and user rank identifiers, the user ranking device finds the user rank identifier corresponding to the Internet access account in the query request through querying, and returns the user rank identifier to the deep packet inspection device. By using this manner, storage space of the deep packet inspection device may be saved.

Step 102: Include the user rank identifier in the access request message, and send the access request message with the user rank identifier to a content provider server, so that the content provider server returns corresponding web page information to the user according to the user rank identifier.

After including the user rank identifier in the access request message, the deep packet inspection device sends the access request message with the user rank identifier to a content provider server, so that the content provider server returns corresponding web page information to the user according to the user rank identifier in the received access request message.

It should be noted that in step 100 and step 101, if the deep packet inspection device cannot obtain the Internet access account of the user or the user rank identifier, namely, if an attempt to obtain the Internet access account of the user or the user rank identifier fails, the deep packet inspection device may return an access rejection message to the user that sends the access request message, or discard the access request message.

By using the method for controlling web page access provided in this embodiment, the user rank identifier is included in the access request message and sent to the content provider server, so that the content provider server returns the corresponding web page information to the user according to the user rank identifier. Therefore, it is implemented that the content provider server performs content ranking and filtering according to the user rank identifier, and web page-level content control is implemented, thereby improving granularity of Internet access content control.

In addition, in the technical solution provided in this embodiment of the present invention, the deep packet inspection device does not need to store and update a blacklist or whitelist database, and does not need to perform a matching calculation on a blacklist or whitelist in a process of performing web page access control, thereby lightening a storage load and a processing load of the deep packet inspection device.

Figure 2:
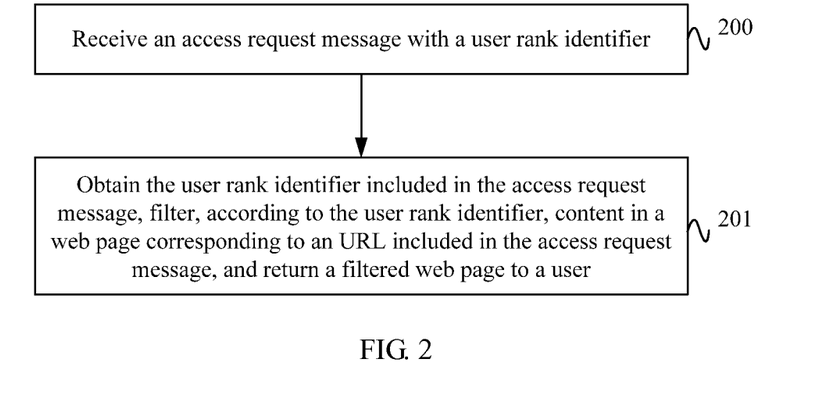
FIG. 2 is another flowchart of a method for controlling web page access according to an embodiment of the present invention.

FIG. 2 is another flowchart of a method for control web page access according to an embodiment of the present invention. As shown in FIG. 2, the method includes:

Step 200: Receive an access request message with a user rank identifier.

A user sends an access request message to a deep packet inspection device after authentication of an Internet access account succeeds. According to the access request message, the deep packet inspection device obtains the Internet access account used by the user to access the Internet, obtains a corresponding user rank identifier according to the Internet access account, and adds the user rank identifier to the access request message. For methods for the deep packet inspection device to obtain, according to the access request message, the Internet access account used by the user to access a network and to obtain the corresponding user rank identifier according to the Internet access account mentioned in this embodiment, reference may be made to the manners mentioned in the method for sending and processing web page information in the foregoing embodiment of the present invention.

A content provider server receives the access request message with the user rank identifier and is sent by the deep packet inspection device.

Step 201: Obtain the user rank identifier included in the access request message, filter, according to the user rank identifier, content in a web page corresponding to a URL included in the access request message, and return filtered web page information to the user.

The content provider server obtains the user rank identifier from the received access request message, and after ranking and filtering, according to the user rank identifier, the content in the web page corresponding to the URL included in the access request message, returns a filtered web page to the user. For example, when the content provider server is a web page server of a web site corresponding to the URL included in the access request message, the web page server performs ranking and filtering according to the user rank identifier, and selects corresponding content for displaying. The web page server may even display content in a same web page based on different user rank identifiers. Alternatively, when the content provider server is a search engine server, the search engine server pre-stores a mapping table of a URL and a link address, where a different link address corresponds to a different user rank identifier. For example, referring to Table 1, a URL "http://www.companycpp.com" corresponds to 3 link addresses, which are "http://www.companycpp_a.com", "http://www.companycpp_b.com" and "http://www.companycpp_c.com", where "http://www.companycpp_a.com" corresponds to a user rank identifier UserRankA, "http://www.companycpp_b.com" corresponds to a user rank identifier UserRankB, and "http://www.companycpp_c.com" corresponds to a user rank identifier UserRankC. After receiving an access request message, the search engine server displays a corresponding link address according to a URL and a user rank identifier that are included in the access request message, and completes a rank-based display. For example, assuming that a URL included in the access request message is "http://www.companycpp.com" and a user rank identifier is UserRankB, the search engine server selects a link address "http://www.companycpp_b.com" in Table 1 for displaying to the user.

TABLE 1

| URL | Corresponding Link Address | User Rank Identifier |
| --- | --- | --- |
| http://www.companycpp.com | http://www.companycpp_a.com | UserRankA |
| | http://www.companycpp_b.com | UserRankB |
| | http://www.companycpp_c.com | UserRankC |

By using the method for controlling web page access provided in this embodiment, the access request message with the user rank identifier is received, ranking and filtering is performed on web page content according to the user rank identifier, and the filtered web page information is returned to the user. It is implemented that the content provider server performs content ranking and filtering according to the user rank identifier, and web page-level content control is implemented, thereby improving granularity of Internet access content control.

Figure 3:
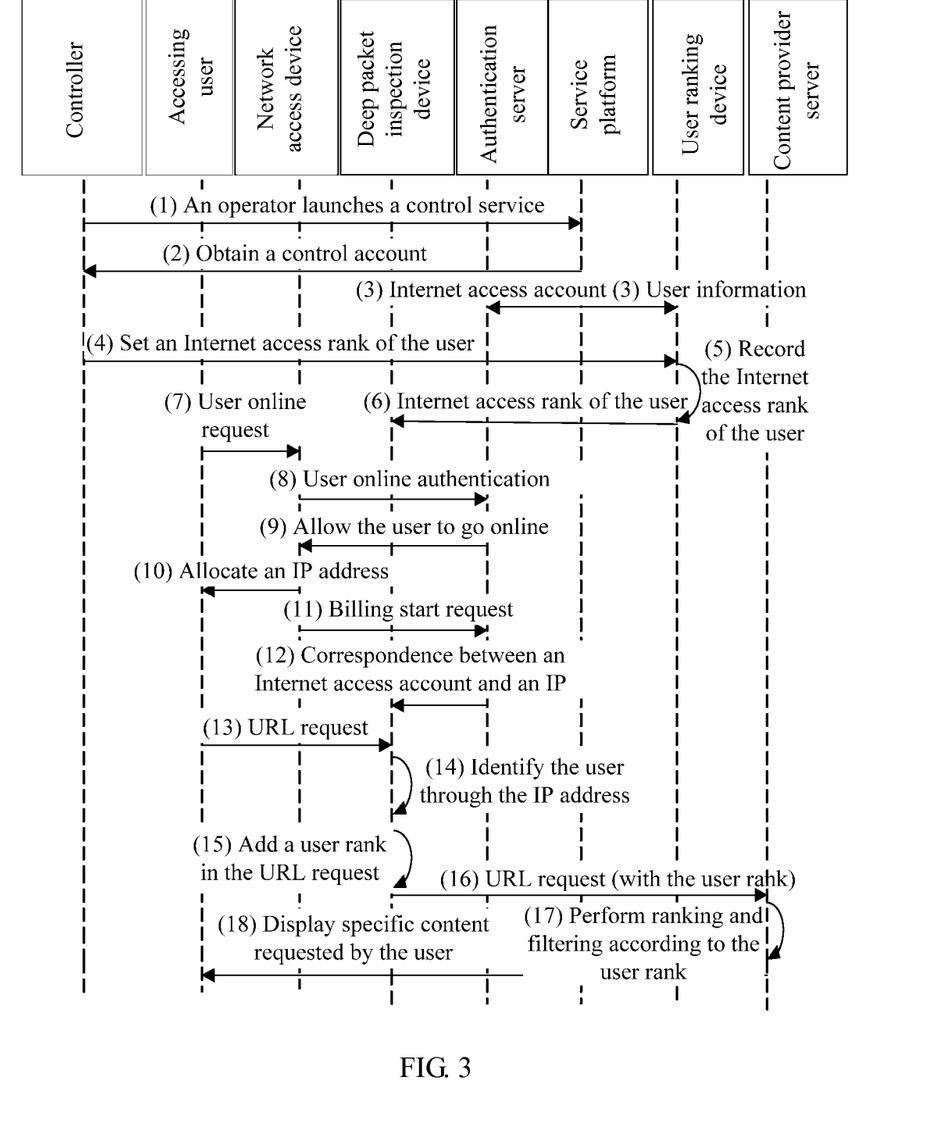
FIG. 3 is a flowchart of a method for controlling web page access applied in a telecom service according to an embodiment of the present invention.

To describe the procedure of the method for controlling web page access more clearly, the following combines the method with a service of an telecom operator, and gives more detailed description through a service on a service platform of the telecom operator:

FIG. 3 is a flowchart of a method for controlling web page access applied in a telecom service according to an embodiment of the present invention. As shown in FIG. 3, a specific processing procedure is as follows:

Step (1): A controller launches an Internet access control service on a service platform of an operator.

Step (2): The controller receives a control account returned by the service platform, and sets a control password.

Step (3): The service platform sends an Internet access account of a user to an authentication server, and sends user information of the controller to a user ranking device. The user information of the controller includes a control account and a control password used by the controller to log in to the user ranking device, and an Internet access account of a user whose rank may be set by the controller.

Step (4): The controller uses the control account and the control password to log in to the user ranking device and sets a user rank identifier of the Internet access account of the user.

Step (5): The user ranking device stores a correspondence list that contains data regarding a correspondence between Internet access accounts and set user rank identifiers.

Step (6): The user ranking device sends the correspondence list which contains data regarding a correspondence between Internet access accounts and user rank identifiers and set by the controller to a deep packet inspection device.

Step (7): The user sends a network access request message with the Internet access account to a network access device.

In a fixed communication network, the network access device may be a broadband remote access server (Broadband Remote Access Server, BRAS); in a mobile communication network, the network access device may be a packet data serving node (Packet Data Serving Node, PDSN) or a gateway GPRS support node (Gateway GPRS Support Node, GGSN).

Step (8): The network access device forwards the network access request message with the Internet access account and is for accessing a network to the authentication server, so that the authentication server performs authentication based on the account on the user who accesses the network through the network access device.

Step (9): After authenticating, according to the locally stored Internet access account, the user who accesses the network, the authentication server sends a network access response that allows the user to access the network to the network access device.

Step (10): The network access device allocates an IP address to the user according to the network access response.

Step (11): The network access device sends, to the authentication server, a billing start request with a correspondence list that contains data regarding a correspondence between Internet access accounts and IP addresses.

Step (12): The deep packet inspection device receives the correspondence list which contains data regarding a correspondence between Internet access accounts and IP addresses and sent by the authentication server, where the correspondence list is obtained by the authentication server according to the billing start request.

Step (13): The deep packet inspection device receives an access request message sent by the user.

Step (14): The deep packet inspection device obtains the IP address of the user from the access request message, and obtains the Internet access account of the user according to the correspondence list that contains data regarding a correspondence between Internet access accounts and IP addresses, wherein the correspondence list is stored in the deep packet inspection device.

Step (15): According to the obtained Internet access account of the accessing user, the deep packet inspection device searches the locally stored correspondence list that contains data regarding a correspondence between Internet access accounts and user rank identifiers and finds the user rank identifier of the user, and includes the user rank identifier found by searching in the access request message.

Step (16): The deep packet inspection device sends the access request message with the user rank identifier to a content provider server.

Step (17): The content provider server ranks and filters web page content according to the user rank identifier in the access request message.

Step (18): The content provider server displays specific content that complies with the user rank identifier of the user to the user.

Persons of ordinary skill in the art should understand that all or part of the steps of the foregoing method embodiments may be implemented by a program instructing relevant hardware. The program may be stored in a computer readable storage medium. When the program runs, the steps of the foregoing method embodiments are performed. The storage medium may include any medium that is capable of storing program codes, such as a ROM, a RAM, a magnetic disk, or an optical disk.

Figure 4:
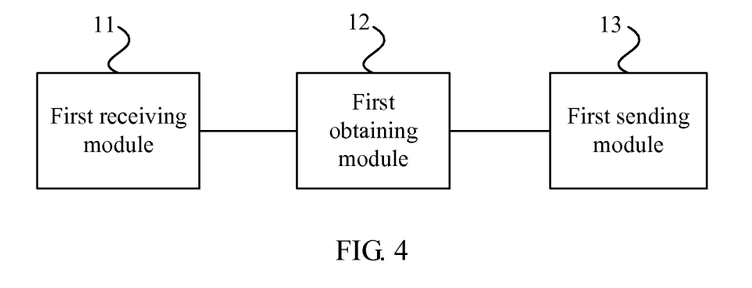
FIG. 4 is a schematic structural diagram of a deep packet inspection device according to an embodiment of the present invention.

FIG. 4 is a schematic structural diagram of a deep packet inspection device according to an embodiment of the present invention. As shown in FIG. 4, the device includes: a first receiving module 11, a first obtaining module 12, and a first sending module 13. The first receiving module 11 is configured to receive an access request message of a user, and obtain an Internet access account of the user according to the access request message; the first obtaining module 12 is configured to obtain a corresponding user rank identifier according to the Internet access account obtained by the first receiving module 11; and the first sending module 13 is configured to include the user rank identifier obtained by the first obtaining module 12 in the access request message, and send the access request message with the user rank identifier to a content provider server, so that the content provider server returns corresponding web page information to the user according to the user rank identifier.

In this embodiment of the invention, the first receiving module 11 is configured to obtain an IP address from the access request message, and search, according to the obtained IP address, a correspondence list which contains data regarding a correspondence between IP addresses and Internet access accounts and is stored in the deep packet inspection device or obtained from an authentication server and find a corresponding Internet access account of the user. Or the first receiving module 11 is configured to obtain identity authentication information of the user from the access request message, and search, according to the obtained identity authentication information, a correspondence list which contains data regarding a correspondence between identity authentication information and Internet access accounts and is stored in the deep packet inspection device or obtained from an authentication server, and find a corresponding Internet access account of the user.

The first obtaining module 12 is configured to send a query request with the Internet access account to a user ranking device, and receive a user rank identifier returned by the user ranking device, where the user rank identifier is a user rank identifier which corresponds to the Internet access account included in the query request and is found by the user ranking device by searching the stored correspondence list that contains data regarding a correspondence between Internet access accounts and user rank identifiers.

Figure 5:
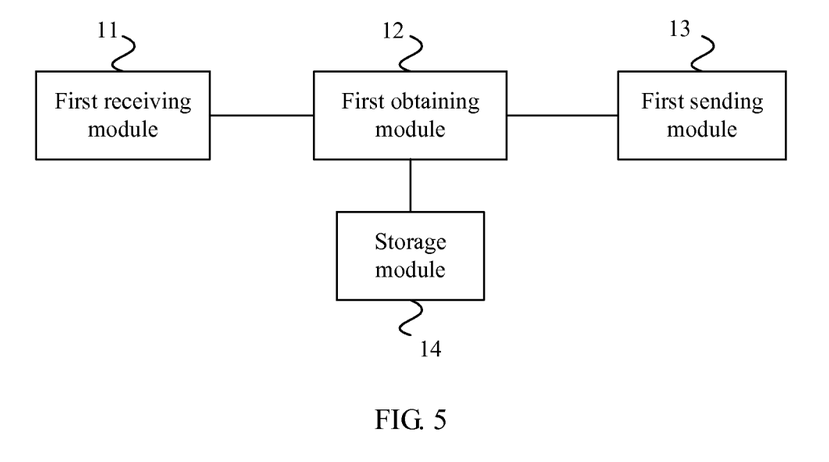
FIG. 5 is another schematic structural diagram of a deep packet inspection device according to an embodiment of the present invention.

FIG. 5 is another schematic structural diagram of a deep packet inspection device according to an embodiment of the present invention. As shown in FIG. 5, based on the foregoing embodiment, the deep packet inspection device further includes a storage module 14. The storage module 14 is configured to store the correspondence list that contains data regarding a correspondence between Internet access accounts and user rank identifiers. Therefore, the first obtaining module 12 is configured to search the correspondence list which contains data regarding a correspondence between Internet access accounts and user rank identifiers and pre-stored in the storage module 14 and find a user rank identifier corresponding to the Internet access account.

For functions and processing procedure of the deep packet inspection device provided in this embodiment, reference may be made to the foregoing method embodiments, and details are not repeatedly described here.

By using the deep packet inspection device provided in this embodiment, the user rank identifier is included in the access request message and sent to the content provider server, so that the content provider server returns the corresponding web page information to the user according to the user rank identifier. Therefore, it is implemented that the content provider server performs content ranking and filtering according to the user rank identifier, and web page-level content control is implemented, thereby improving granularity of Internet access content control.

Figure 6:
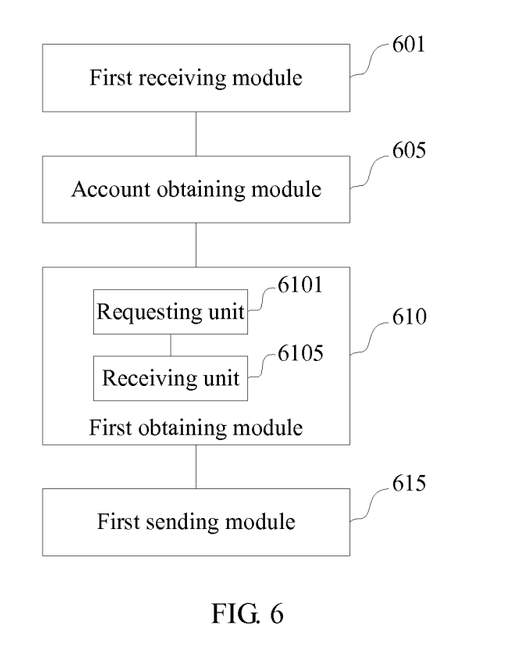
FIG. 6 is another schematic structural diagram of a deep packet inspection device according to an embodiment of the present invention.

FIG. 6 is another schematic structural diagram of a deep packet inspection device according to an embodiment of the present invention. As shown in FIG. 6, the deep packet inspection device includes:

A first receiving module 601 is configured to receive an access request message of a user, where the access request message includes a web page address that the user intends to access and user information of the user, and the user information includes address information and/or identity authentication information of the user.

The address information of the user includes IP address information of the user, and may also include MAC (media access control, MAC) address information of the user, and so on. Address information is not limited here as long as the address information can indicate location information of the user.

An account obtaining module 605 is configured to obtain an Internet access account of the user according to the address information and/or the identity authentication information of the user.

In one case, the account obtaining module 605 may, according to the IP address included in the access request message, search a correspondence list that contains data regarding a correspondence between IP addresses and Internet access accounts and find a corresponding Internet access account of the user, wherein the correspondence list is stored in the deep packet inspection device; or search a correspondence list which contains data regarding a correspondence between IP addresses and Internet access accounts and obtained from an authentication server and find a corresponding Internet access account of the user.

In another case, the account obtaining module 605 may, according to the identity authentication information which is of the user and included in the access request message, search a correspondence list that contains data regarding a correspondence between identity authentication information and Internet access accounts and find a corresponding Internet access account of the user, wherein the correspondence list is stored in the deep packet inspection device; or search a correspondence list which contains data regarding a correspondence between identity authentication information and Internet access accounts and obtained from an authentication server and find a corresponding Internet access account of the user.

A first obtaining module 610 is configured to obtain a user rank identifier of the user according to the Internet access account obtained by the account obtaining module 605.

In one case, the first obtaining module 610 may include:
 a requesting unit 6101, configured to send a query request with the Internet access account to a user ranking device; and a receiving unit 6105, configured to receive a user rank identifier returned, according to the Internet access account, by the user ranking device, where the user rank identifier is a user rank identifier which corresponds to the Internet access account and is found by the user ranking device by searching, according to the Internet access account included in the query request, stored a correspondence list that contains data regarding a correspondence between Internet access accounts and user rank identifiers.

In another case, the first obtaining module 610 may search a stored correspondence list that contains data regarding a correspondence between Internet access accounts and user rank identifiers and find a user rank identifier corresponding to the Internet access account.

A first sending module 615 is configured to include the user rank identifier obtained by the first obtaining module 610 in the access request message, and send the access request message with the user rank identifier to a content provider server, so that the content provider server returns corresponding web page content to the user according to the user rank identifier and the web page address that the user intends to access.

By using the deep packet inspection device provided in this embodiment, the user rank identifier is included in the access request message and sent to the content provider server, so that the content provider server returns the corresponding web page information to the user according to the user rank identifier. Therefore, it is implemented that the content provider server performs content ranking and filtering according to the user rank identifier, and web page-level content control is implemented, thereby improving granularity of Internet access content control.

Figure 7:
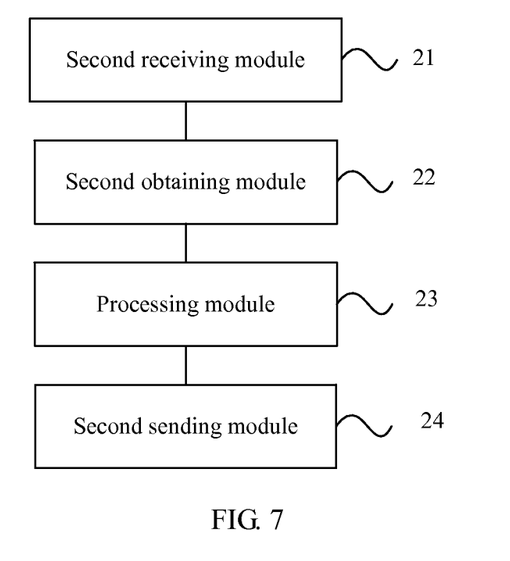
FIG. 7 is a schematic structural diagram of a content provider server according to an embodiment of the present invention.

FIG. 7 is a schematic structural diagram of a content provider server according to an embodiment of the present invention. As shown in FIG. 7, the content provider server includes: a second receiving module 21, a second obtaining module 22, a processing module 23, and a second sending module 24.

The second receiving module 21 is configured to receive an access request message with a user rank identifier.

The second obtaining module 22 is configured to obtain the user rank identifier from the access request message received by the second receiving module 21.

The processing module 23 is configured to filter, according to the user rank identifier included in the access request message obtained by the second obtaining module 22, content in a web page corresponding to a URL included in the access request message.

The second sending module 24 is configured to return web page information filtered by the processing module 23 to a user.

For functions and processing procedures of the content provider server provided in this embodiment, reference may be made to the foregoing method embodiments, and details are not repeatedly described here.

By using the content provider server provided in this embodiment, the access request message with the user rank identifier is received, ranking and filtering is performed according to the user rank identifier, and the corresponding web page information is returned to the user. It is implemented that the content provider server performs content ranking and filtering according to the user rank identifier, and web page-level content control is implemented, thereby improving granularity of Internet access content control.

Figure 8:
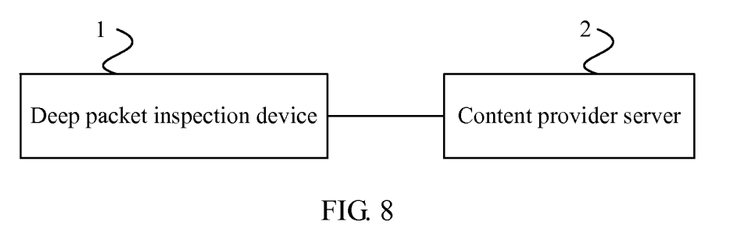
FIG. 8 is a schematic structural diagram of a system for controlling web page access according to an embodiment of the present invention.

FIG. 8 is a schematic structural diagram of a system for controlling web page access according to an embodiment of the present invention. As shown in FIG. 8, the system includes a deep packet inspection device 1 and a content provider server 2. The deep packet inspection device 1 may be the deep packet inspection device shown in FIG. 4 to FIG. 6, and the content provider server may be the content provider server shown in FIG. 7. For a specific structure, functions and processing procedures of the devices in the system for controlling web page access provided in this embodiment, reference may be made to the foregoing method and device embodiments, and details are not repeatedly described here.

In the foregoing embodiments, the description of each embodiment has its emphasis, and for part that is not described in detail in a certain embodiment, reference may be made to the relevant description of other embodiments. Finally, it should be noted that the foregoing embodiments are intended for describing the technical solutions of the present invention rather than limiting the present invention. Although the present invention is described in detail with reference to the foregoing embodiments, persons of ordinary skill in the art should understand that they may still make modifications to the technical solutions described in the foregoing embodiments or make equivalent substitutions to part of technical features; however, these modifications or substitutions do not make the essence of the corresponding technical solutions depart from the spirit and scope of the technical solutions of the embodiments of the present invention.

What is claimed is:

1. A method performed by a deep packet inspection device on a network for controlling web page access, comprising:
  receiving an access request message of a user, wherein the access request message includes a web page address of a web page that the user intends to access and user information of the user;
  obtaining an Internet access account of the user according to the user information;
  assigning to the user a user rank identifier selected from a plurality of preset user rank identifiers according to the Internet access account of the user;
  incorporating the user rank identifier assigned to the user into the access request message, and
  sending the access request message to a content provider server to request the content provider server to return web page content corresponding to the user rank identifier to the user according to the user rank identifier and the web page address.

2. The method for controlling web page access according to claim 1, wherein the step of obtaining an Internet access account of the user comprises:
  obtaining an IP address from the access request message, and searching a correspondence list according to the obtained IP address to find a corresponding Internet access account of the user, wherein the correspondence list contains data regarding a correspondence between IP addresses and Internet access accounts and is stored in the deep packet inspection device or obtained from an authorization authentication accounting AAA server; or
  obtaining an identity authentication information of the user from the access request message, and searching a correspondence list according to the obtained identity authentication information to find a corresponding Internet access account of the user, wherein the correspondence list contains data regarding a correspondence between identity authentication information and Internet access accounts and is stored in the deep packet inspection device or obtained from an AAA server.

3. The method for controlling web page access according to claim 2, wherein the step of obtaining a user rank identifier of the user comprises:

searching a correspondence list that contains data regarding a correspondence between Internet access accounts and user rank identifiers, and finding the user rank identifier corresponding to the Internet access account, wherein the correspondence list is pre-stored in the deep packet inspection device; or sending a query request with the Internet access account to a user ranking device and receiving the user rank identifier returned, according to the Internet access account, by the user ranking device.

4. The method for controlling web page access according to claim 1, wherein the step of obtaining a user rank identifier of the user comprises:

searching a correspondence list containing data regarding a correspondence between Internet access accounts and user rank identifiers and finding the user rank identifier corresponding to the Internet access account, wherein the correspondence list is pre-stored in the deep packet inspection device; or sending a query request with the Internet access account to a user ranking device and receiving the user rank identifier returned, according to the Internet access account, by the user ranking device.

5. A deep packet inspection device, comprising:

a first receiving module, configured to receive an access request message of a user, wherein the access request message includes a web page address of a web page that the user intends to access and user information of the user;

an account obtaining module, configured to obtain an Internet access account of the user according to the user information;

an assigning module, configured to assigning to the user a user rank identifier selected from a plurality of preset user rank identifiers according to the Internet access account of the user; and a first sending module, configured to incorporate the user rank identifier assigned to the user into the access request message, and send the access request message to a content provider server to request the content provider server to return web page content corresponding to the user rank identifier to the user according to the user rank identifier and the web page address.

6. The deep packet inspection device according to claim 5, wherein the account obtaining module is configured to:

obtain an IP address from the access request message, and search, according to the obtained IP address, a correspondence list that contains data regarding a correspondence between IP addresses and Internet access accounts and is stored in the deep packet inspection device or obtained from an authentication server and find a corresponding Internet access account of the user; or obtain an identity authentication information of the user from the access request message, and search, according to the obtained identity authentication information, a correspondence list that contains data regarding a correspondence between identity authentication information and Internet access accounts and is stored in the deep packet inspection device or obtained from an authentication server and find a corresponding Internet access account of the user.

7. The deep packet inspection device according to claim 6, wherein the first obtaining module comprises:

a requesting unit, configured to send a query request with the Internet access account to a user ranking device; and a receiving unit, configured to receive a user rank identifier returned, according to the Internet access account, by the user ranking device.

8. The deep packet inspection device according to claim 6, further comprising:

a storage module, configured to store the correspondence list regarding a correspondence between Internet access accounts and user rank identifiers, wherein the first obtaining module is configured to search the correspondence list regarding a correspondence between Internet access accounts and user rank identifiers and find a user rank identifier corresponding to the Internet access account.

9. The deep packet inspection device according to claim 5, wherein the first obtaining module comprises:

a requesting unit, configured to send a query request with the Internet access account to a user ranking device; and a receiving unit, configured to receive a user rank identifier returned, according to the Internet access account, by the user ranking device.

10. The deep packet inspection device according to claim 5, further comprising:

a storage module, configured to store the correspondence list regarding a correspondence between Internet access accounts and user rank identifiers, wherein the first obtaining module is configured to search the correspondence list regarding a correspondence between Internet access accounts and user rank identifiers and find a user rank identifier corresponding to the Internet access account.

11. A system for controlling web page access, comprising a deep packet inspection device and a content provider server, wherein the deep packet inspection device comprises, a first receiving module, configured to receive an access request message of a user, wherein the access request message includes a web page address of a web page that the user intends to access and user information of the user;

an account obtaining module, configured to obtain an Internet access account of the user according to the user information;

an assigning module, configured to assigning to the user a user rank identifier selected from a plurality of preset user rank identifiers according to the Internet access account of the user; and a first sending module, configured to incorporate the user rank identifier assigned to the user into the access request message, and send the access request message to the content provider server; and the content provider server comprises, a second receiving module, configured to receive the access request message sent by the deep packet inspection device;

a second obtaining module, configured to obtain the user rank identifier from the access request message received by the second receiving module;

a processing module, configured to filter, according to the user rank identifier obtained by the second obtaining module, content in a web page corresponding to the web page address; and a second sending module, configured to return web page content filtered by the processing module to the user.

12. A system for controlling web page access according to claim 11, wherein the account obtaining module is configured to:

obtain an IP address from the access request message, and search, according to the obtained IP address, a correspondence list that contains data regarding a correspondence between IP addresses and Internet access accounts and is stored in the deep packet inspection device or obtained from an authentication server and find a corresponding Internet access account of the user; or obtain an identity authentication information of the user from the access request message, and search, according to the obtained identity authentication information, a correspondence list that contains data regarding a correspondence between identity authentication information and Internet access accounts and is stored in the deep packet inspection device or obtained from an authentication server and find a corresponding Internet access account of the user.

13. A system for controlling web page access according to claim 11, wherein the first obtaining module comprises:
  a requesting unit, configured to send a query request with the Internet access account to a user ranking device; and
  a receiving unit, configured to receive a user rank identifier returned, according to the Internet access account, by the user ranking device.

14. A system for controlling web page access according to claim 11, further comprising:
  a storage module, configured to store the correspondence list regarding a correspondence between Internet access accounts and user rank identifiers,
  wherein the first obtaining module is configured to search the correspondence list and find a user rank identifier corresponding to the Internet access account.

* * * * *